(12) United States Patent
Woolley et al.

(10) Patent No.: US 8,456,446 B2
(45) Date of Patent: Jun. 4, 2013

(54) VISUAL CLARITY OF A SUBSTANTIALLY TRANSPARENT TOUCHPAD

(75) Inventors: Richard D. Woolley, Orem, UT (US); Paul H. Glad, Taylorsville, UT (US)

(73) Assignee: Cirque Corporation, Salt Lake City, UT (US)

( * ) Notice: Subject to any disclaimer, the term of this patent is extended or adjusted under 35 U.S.C. 154(b) by 273 days.

(21) Appl. No.: 12/815,038

(22) Filed: Jun. 14, 2010

(65) Prior Publication Data

US 2010/0328207 A1 Dec. 30, 2010

Related U.S. Application Data

(60) Provisional application No. 61/186,778, filed on Jun. 12, 2009.

(51) Int. Cl.
*G06F 3/045* (2006.01)
*G06F 3/044* (2006.01)

(52) U.S. Cl.
USPC ........................................ 345/174; 178/18.06

(58) Field of Classification Search
None
See application file for complete search history.

(56) References Cited

U.S. PATENT DOCUMENTS

| 2008/0245582 | A1* | 10/2008 | Bytheway | 178/18.06 |
| 2009/0213090 | A1* | 8/2009 | Mamba et al. | 345/174 |
| 2009/0315854 | A1* | 12/2009 | Matsuo | 345/174 |

* cited by examiner

*Primary Examiner* — Andrew L Sniezek
(74) *Attorney, Agent, or Firm* — Morriss O'Bryant Compagni, PC

(57) ABSTRACT

The creation of a checkerboard pattern of a plurality of conductive but electrically floating panels of conductive material that are disposed in the space between electrodes on the layers of X and Y electrodes, wherein each panel is separated from adjacent panels by a minimal gap, wherein the panels are aligned such that when viewed from above, the panels appear to form a continuous ITO surface, wherein the panels are not visible to the user from typical user distances, wherein the dis-color effect between etched empty fields and ITO electrodes is thereby eliminated by creating an apparently homogeneous touchpad surface.

3 Claims, 5 Drawing Sheets

VISUAL CLARITY OF A SUBSTANTIALLY TRANSPARENT TOUCHPAD

CROSS REFERENCE TO RELATED APPLICATIONS

This document claims priority to and incorporates by reference all of the subject matter included in the provisional patent application, having Ser. No. 61/186,778.

BACKGROUND OF THE INVENTION

1. Field of the Invention

This invention relates generally to touchpads. More specifically, the present invention is a system and method for improving the visual clarity of a touchpad that is disposed over a display screen, to thereby improve the transparency of the touchpad so that visual interference by the touchpad is reduced and more of the light transmitted by the display screen is visible to a user.

2. Description of Related Art

There are several designs for capacitance sensitive touchpads. One of the existing touchpad designs that can be modified to work with the present invention is a touchpad made by CIRQUE® Corporation. Accordingly, it is useful to examine the underlying technology to better understand how any capacitance sensitive touchpad can be modified to work with the present invention.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22; and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Pointing object position determination is then performed by using an equation that compares the magnitude of the two signals measured.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention.

The process above is repeated for the Y or column electrodes 14 using a P, N generator 24

Although the CIRQUE® touchpad described above uses a grid of X and Y electrodes 12, 14 and a separate and single sense electrode 16, the sense electrode can actually be the X or Y electrodes 12, 14 by using multiplexing. Either design will enable the present invention to function.

The X, Y and sense electrodes described above are disposed on one or more substrates. In the case of a substantially transparent substrate, the substrate is a non-conductive material and the electrodes are formed using a material that will have minimal visual interference such as Indium Tin Oxide (ITO). The electrodes are also made as thin as possible to further reduce their visual impact. Some examples of possible substrate materials include but should not be considered as limited to materials such as MYLAR™ or a clear plastic.

BRIEF SUMMARY OF THE INVENTION

An embodiment of the invention is the creation of a checkerboard pattern of a plurality of conductive but electrically floating panels of conductive material that are disposed in the space between electrodes on the layers of X and Y electrodes, wherein each panel is separated from adjacent panels by a minimal gap, wherein the panels are aligned such that when viewed from above, the panels appear to form a continuous ITO surface, wherein the panels are not visible to the user from typical user distances, wherein the dis-color effect between etched empty fields and ITO electrodes is thereby eliminated by creating an apparently homogeneous touchpad surface.

In a first aspect of the invention, the panels prevent signal coupling across the gaps between electrodes to thereby prevent attenuation of any signal being measured.

In a second aspect of the invention, the panels are disposed in an alternating pattern on different substrates.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Figure 1:
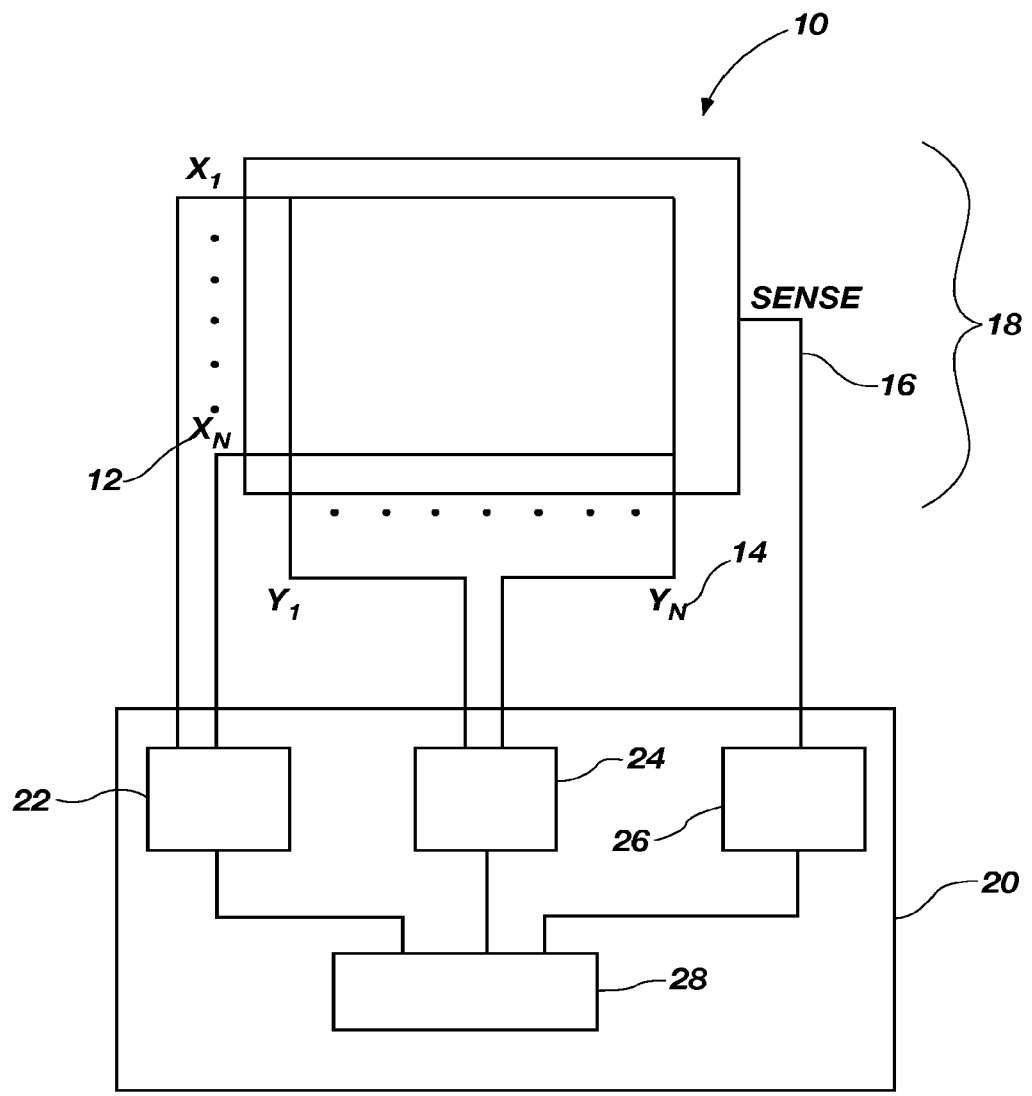
FIG. 1 is a block diagram of operation of a first embodiment of a touchpad that is found in the prior art, and which is adaptable for use in the present invention.
Figure 2:
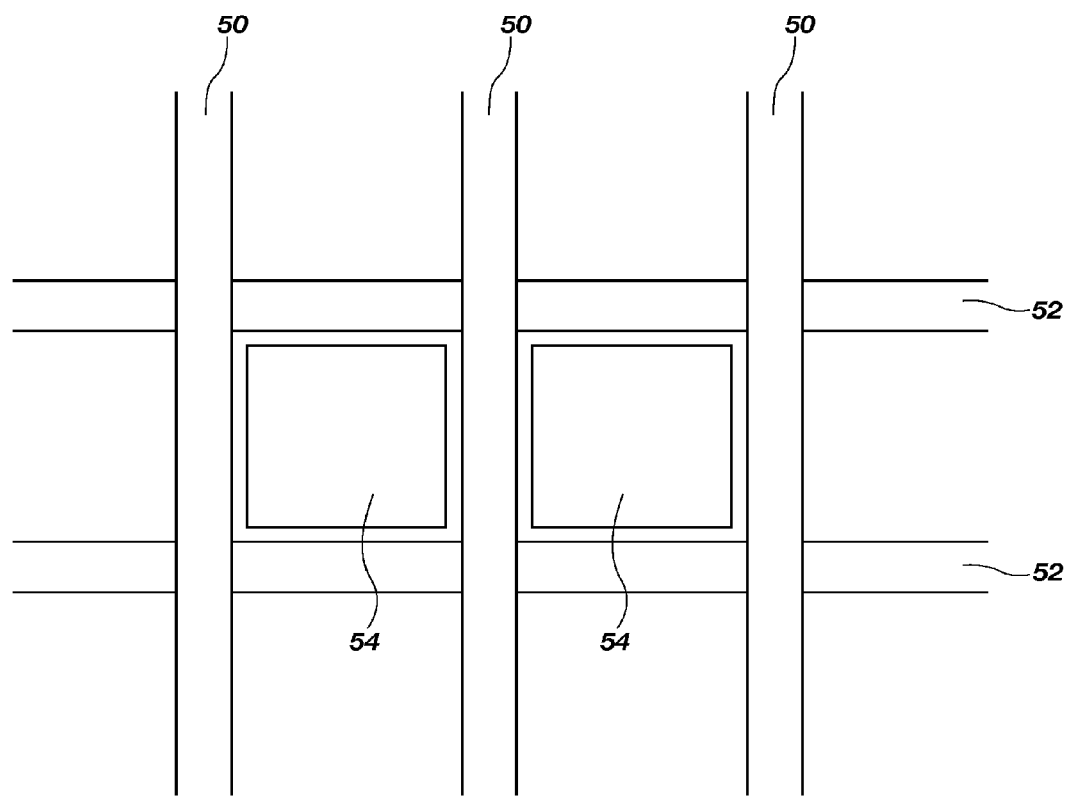
FIG. 2 is a close-up top view of electrodes and a flooded plaid design that suffers from attenuated signal problems, but which also improved visual clarity.

FIG. 2 is a top close-up view of electrodes and a large "flooded plaid" prior art design. The scale of drawings should not be considered to be at actual scale, and are for illustration purposes only. Furthermore, the size of the gaps between objects should not be considered to be accurate, but are instead exaggerated for illustration purposes.

In this figure are shown a few X electrodes 50 and a few Y electrodes 52. In the space between the electrodes 50, 52, a panel 54 of filler material has been disposed which is comprised of ITO. Thus, the panel 54 is conductive but electrically floating.

The purpose of the panel 54 is to improve the visual clarity of the touchpad. Specifically, a dis-color effect is created when only the electrodes 50, 52 are present. The dis-color effect is the result of a non-homogeneous appearance when the electrodes 50, 52 contrast with the empty space between the electrodes. While the ITO electrodes 50, 52 are nearly transparent and their width is relatively small, the contrast is nonetheless visible, and visual clarity through the grid of electrodes 50, 52 is impaired by the dis-color effect. The panel 54 effectively eliminates the dis-color effect of the touchpad. However, a problem with the touchpad using a large panel 54 is that the panel attenuates the signal being measured, thereby reducing the effectiveness of the touchpad.

Figure 3:
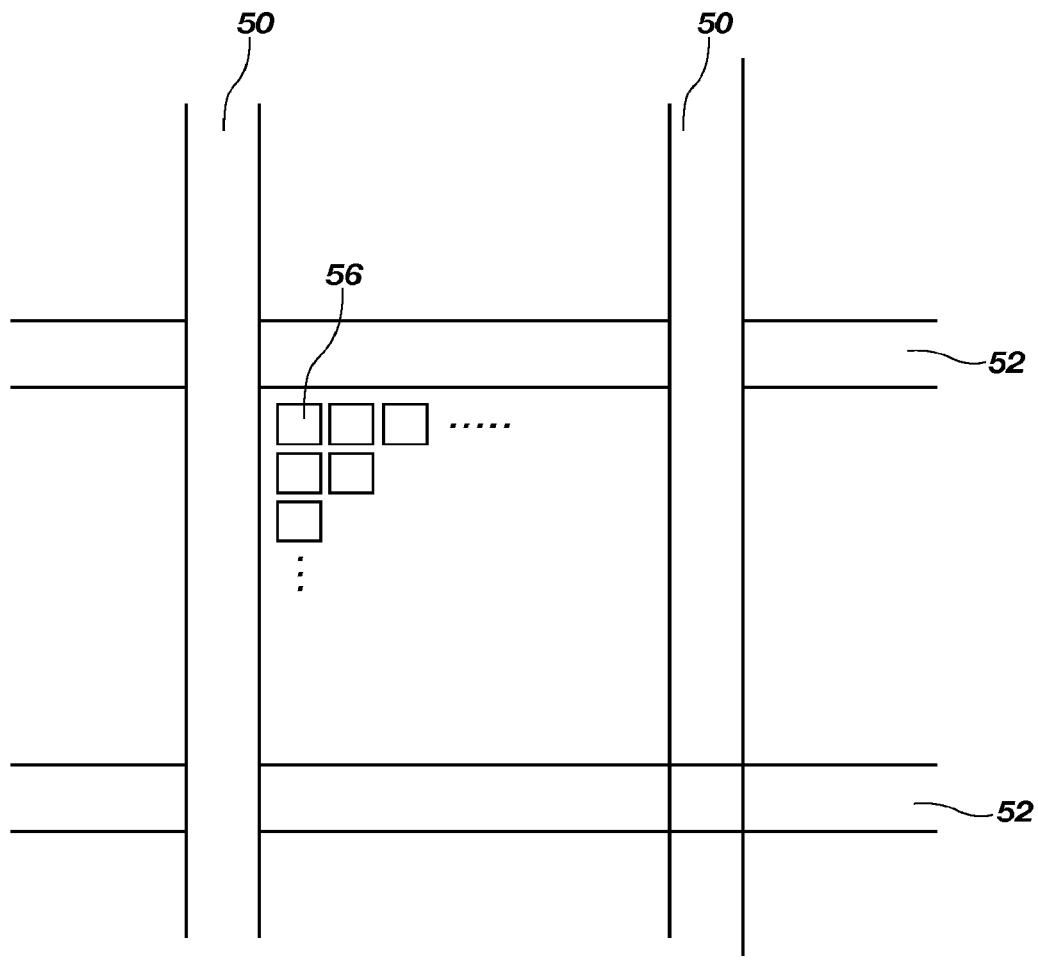
FIG. 3 is a close-up top view of electrodes and the new checkerboard pattern design in a first embodiment of the present invention.

FIG. 3 is provided as an improvement over the panel 54 as shown in FIG. 2. Specifically, the single large panel 54 disposed in the empty space between the electrodes 50, 52 is replaced by a plurality of small panels 56. The small panels 56 fill the same empty space between the electrodes 50, 52. However, the small panels 56 avoid signal coupling between electrodes, and thus there is little or no attenuation of a signal that the touchpad is trying to measure.

The shape of the panels 56 are shown as squares, but should not be considered as limited by this example. Any shape can be substituted as long as there is a gap around each edge of the panels 56.

In this top view illustrated in FIG. 3, the small panels 56 appear to be on a single level of the substrate. However, the small panels 56 are disposed on at least two different layers of the touchpad.

Figure 4:
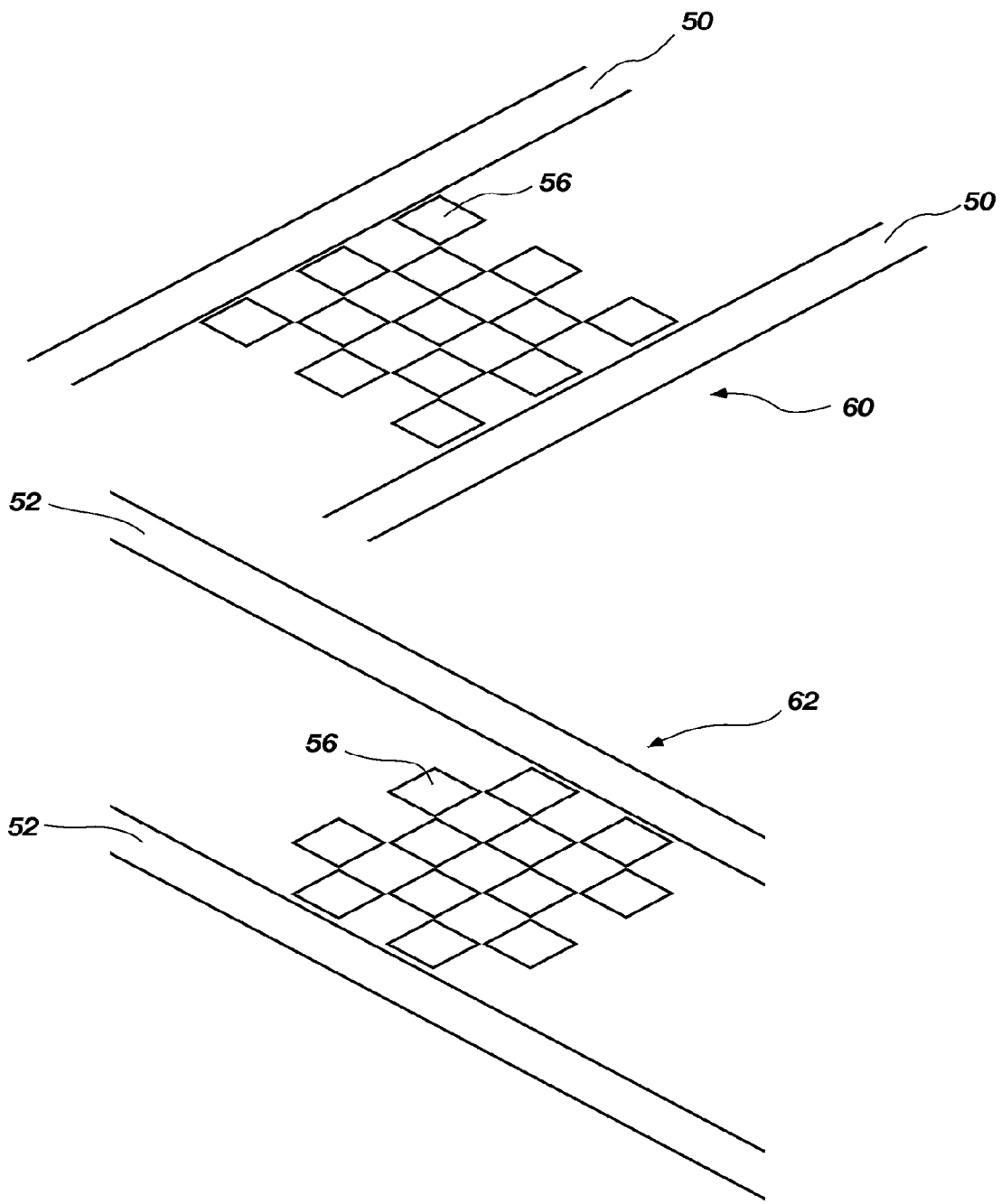
FIG. 4 is a close-up perspective view of two layers of a touchpad that illustrates the checkerboard pattern of panels.

FIG. 4 is a perspective view of two layers 60 and 62 of a portion of the touchpad as shown in FIG. 3. Specifically, it is seen that the small panels 56 alternate being disposed on a first layer 60 of the substrate on which the X electrodes 50 are disposed and a second layer 62 of the substrate on which the Y electrodes 52 are disposed. The checkerboard pattern of the small panels 56 is now easily discernible. The layers 60, 62 might be physically separate substrate layers, or opposite sides of a single substrate layer. What is important is that the electrodes 50, 52 and the panels 56 can be disposed on separate layers of the touchpad.

It should be noted that the exact number of small panels 56 that can fill the empty space between the X and Y electrodes 50, 52 can be adjusted as needed, and that the number shown are for illustration purposes only. However, a sufficient number of panels 56 are needed to prevent attenuation of the signal being measured. Accordingly, the criteria for selecting how many panels 56 should be used might constitute a subjective measure. Reducing attenuation of signal and improving visual clarity with minimized distortion are the criteria to be used.

Figure 5:
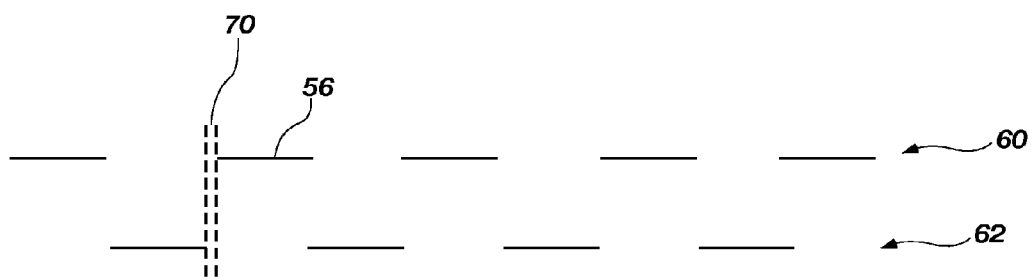
FIG. 5 is a profile view of a single row of panels 56.

FIG. 5 is a profile view of a single row of panels 56. The panels 56 are shown disposed on the first layer 60 and the second layer 62. When the panels 56 are overlapping or misaligned, the edges of the panels 56 become more visible than if a gap 70 is present between every edge of the panels and all adjacent panels and the electrodes 50, 52. Thus, the gap 70 is important for decreasing the visibility of the panels 56 and the overall homogeneous look of the touchpad. Accordingly, the rule that should be followed is that the gap 70 be present around all edges of each of the panels 56.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for increasing visual clarity of a mutual capacitance sensitive touch sensor, said method comprised of the steps of:
   1) providing a plurality of parallel X electrodes and disposed on a first layer of a substantially transparent substrate;
   2) providing a plurality of parallel Y electrodes and disposed on a second layer of the substrate, wherein the Y electrodes are orthogonal to the X electrodes; and
   3) disposing a plurality of electrically floating conductors in an area between the X electrodes and the Y electrodes when the X electrodes and the Y electrodes are viewed from above, wherein the plurality of electrically floating conductors include a gap around each edge thereof, and wherein the plurality of electrically floating conductors is selected so as not to attenuate any signal being driven or measured, the plurality of electrically floating conductors being arranged in an alternating pattern wherein adjacent electrically floating conductors that share a side as viewed from above are always on a different layer of the touch sensor.

2. A method for increasing visual clarity of a mutual capacitance sensitive touch sensor, said method comprised of the steps of:
   1) providing a plurality of parallel X electrodes and disposed on a first layer of a substantially transparent substrate;
   2) providing a plurality of parallel Y electrodes and disposed on a second layer of the substrate, wherein the Y electrodes are orthogonal to the X electrodes; and
   3) disposing a plurality of electrically floating conductors in an area between the X electrodes and the Y electrodes when the X electrodes and the Y electrodes are viewed from above, wherein the plurality of electrically floating conductors include a gap around each edge thereof, and wherein the plurality of electrically floating conductors is selected so as not to impair the visual clarity of the touch sensor, the plurality of electrically floating conductors being arranged in an alternating pattern wherein adjacent electrically floating conductors that share a side as viewed from above are always on a different layer of the touch sensor.

3. A touchpad design for increasing visual clarity of a mutual capacitance sensitive touchpad, said touchpad comprised of:
- a plurality of parallel X electrodes and disposed on a first layer of a substantially transparent substrate;
- a plurality of parallel Y electrodes and disposed on a second layer of the substrate, wherein the Y electrodes are orthogonal to the X electrodes; and
- a plurality of electrically floating conductors in an area between the X electrodes and the Y electrodes when the X electrodes and the Y electrodes are viewed from above, wherein the plurality of electrically floating conductors include a gap around each edge thereof, and wherein the plurality of electrically floating conductors is selected so as not to attenuate any signal being driven or measured, the plurality of electrically floating conductors being arranged in an alternating pattern wherein adjacent electrically floating conductors that share a side as viewed from above are always on a different layer of the touch sensor.

\* \* \* \* \*